United States Patent [19]
Bockwoldt

[11] 3,781,591
[45] Dec. 25, 1973

[54] SYSTEM FOR CONTROLLING THE TARGET VOLTAGE OF IMAGE SENSORS

[75] Inventor: Walter H. Bockwoldt, Woodland Hills, Calif.

[73] Assignee: Hughes Aircraft Company, Culver City, Calif.

[22] Filed: Aug. 31, 1972

[21] Appl. No.: 285,282

[52] U.S. Cl. .......... 315/30
[51] Int. Cl. .......... H01j 29/52
[58] Field of Search .......... 315/22, 30, 31 R

[56] References Cited

UNITED STATES PATENTS

| | | | |
|---|---|---|---|
| 2,911,562 | 11/1959 | Fathauer | 315/30 X |
| 2,930,929 | 3/1960 | Shelton | 315/30 X |
| 3,027,421 | 3/1962 | Heijligers | 315/30 X |

*Primary Examiner*—Carl D. Quarforth
*Assistant Examiner*—P. A. Nelson
*Attorney*—W. H. MacAllister et al.

[57] ABSTRACT

Herein is disclosed a system for automatically controlling the target voltage applied to the photoconductor of a television camera so as to provide improved performance over a wide range of photoconductor (target) luminance and temperature conditions. Means are provided for monitoring the dark current read from a masked portion of the photoconductor, and for subtracting the dark current from the total camera's output current to produce a signal, indicative to a substantial degree, of only signal current resulting from scene illumination. The signal current and the total current are processed within an electronic voltage control servo system such that during a first mode of operation (high target luminance and/or low target temperature) the vidicon target voltage is controlled to maintain a constant average signal current; and during a second mode of operation (low target luminance and/or high target temperature) the vidicon target voltage is controlled to maintain a preselected maximum average total current.

9 Claims, 4 Drawing Figures

SYSTEM FOR CONTROLLING THE TARGET VOLTAGE OF IMAGE SENSORS

The invention claimed herein was made in the course of or under a contract with the Department of the Air Force.

BACKGROUND OF THE INVENTION

This invention relates to systems for controlling the target voltage of an image sensor so as to provide improved performance over a wide range of target luminance and temperature conditions.

Heretofore television camera systems which included means for automatically controlling the vidicon target voltage were mechanized to provide the control as a function of the total vidicon output current; and these prior art systems maintain a constant total current over the entire range of scene luminance and photoconductor temperature conditions. This type of control technique sacrifices dynamic range potential under high scene luminance and/or low temperature conditions, and results in less than optimum signal to noise ratios under low scene luminance and/or high temperature conditions.

SUMMARY OF THE INVENTION

It is therefore a primary object of the invention to provide a system for controlling the characteristics of an image sensor so as to optimize the signal current output.

It is another object to provide a system for controlling the target (photoconductor) bias voltage applied to a television camera so as to provide an improved signal to noise ratio at high temperatures (e.g., above 30° C) and/or low faceplate luminance (e.g., below 5 foot candles).

A further object is to provide a television camera control system which maintains the signal current relatively constant over a large range of temperature and scene luminance conditions.

Yet another object is to provide a television camera control system which allows improved signal dynamic range.

Still a further object is to provide a camera control system which requires less adjustment of the contrast and brightness controls of the associated display monitor, as target luminance and/or temperature varies.

According to one preferred embodiment of the subject invention, means are provided for monitoring the dark current read from a masked portion of a television camera's photoconductor (target), and for subtracting the dark current from the total camera's output current to provide a signal indicative of the signal current only. The signal current and total current are processed within an electronic voltage control servo system such that during a first operational mode (high target luminance and/or low temperature) the vidicon target voltage is controlled to maintain a constant preselected average signal current level; and during a second operational mode (low target luminance and/or high temperature) the target voltage is controlled to maintain a preselected maximum value for the total current.

BRIEF DESCRIPTION OF THE DRAWINGS

The novel features of this invention, as well as the invention itself, will be best understood from the accompanying description taken in connection with the accompanying drawings in which like reference characters refer to like parts and in which.

DESCRIPTION OF THE PREFERRED EMBODIMENT

Figure 1:
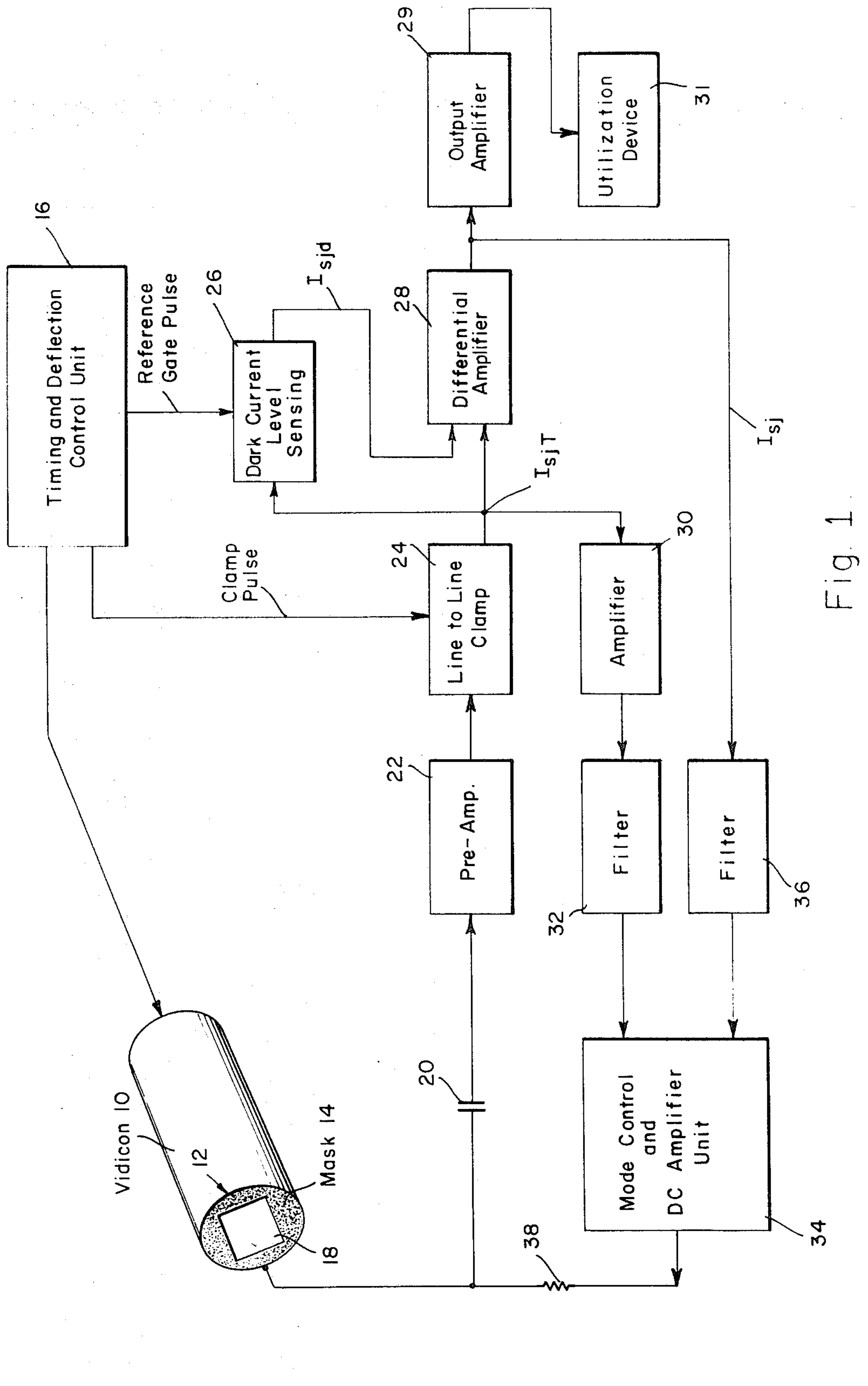
FIG. 1 is a block diagram of a television sensor system incorporating a target voltage control subsystem in accordance with the invention.

Referring first primarily to FIG. 1, the system there shown includes an image sensor 10, which may be a vidicon unit having a photoconductor (target) comprised of antimony tri-sulfide, for example, deposited on a face-plate 12. The photoconductor produces a dark current ($I_{sjd}$) that becomes significant compared to the signal current ($I_{sj}$), at high vidicon target voltages and/or high temperatures. A portion of faceplate 12 is covered with an opaque reference mask 14, indicated by the crosshatched section of faceplate 12. The mask 14 may be deposited on either the inside or outside surface of the faceplate.

Timing and deflection control unit 16 provides horizontal and vertical deflection signals to vidicon 10, which signals are sufficient to cause the readout electron beam to scan the masked area 14 of the photoconductor, as well as the scene area 18. As used herein, the term "dark current" or "dark current component" refers to the output current of the vidicon which is produced during the time period the electron beam scans the masked area. The term "signal current" refers to the component of the vidicon's output current which results primarily from scene luminance. The term "luminance" is defined as the luminous intensity of any surface in a given direction per unit of projected area of the surface, as viewed from that direction.

The output video signal from vidicon 10 is applied through a coupling capacitor 20 and a preamplifier unit 22 to a line to line clamp circuit 24. Circuit 24 is synchronized by clamp pulses applied from unit 16 during the periods the vidicon readout beam is "cut off;" and circuit 24 operates to establish a zero current DC reference. The operation of line to line clamp circuit 24 is well known to those skilled in the art, and therefore is not described in greater detail herein.

The DC restored video, designated total current ($I_{sjT}$) in FIG. 1, is aPplied from the output of clamp circuit 24 to a dark current level sensing unit 26, which senses the dark current value and provides a time weighted average signal ($I_{sjd}$) indicative thereof. Sensing unit 26 may have a time constant of six vertical fields, for example. The dark current sampling interval is determined by the reference gate pulse applied from timing and deflection control unit 16. The reference gate pulse is applied during the time the readout electron beam scans the masked portion 14 of photoconductor 12. Circuits for providing a reference pulse in coincidence with a selected portion of a television scan raster are well known in the art, such as the circuits and technique described in U.S. Pat. No. 3,586,770, for example.

The dark current value ($I_{sjd}$) is subtracted from the total current ($I_{sjT}$) within a differential amplifier 28, and the output signal therefrom is the signal current ($I_{sj}$) only. The signal current ($I_{sj}$) is applied through an output amplifier 29 to a utilization device 31, which may be a display monitor, for example.

The total current ($I_{sjT}$) is amplified within an amplifier unit 30 and then applied through a servo filter 32 to a mode control and DC amplifier unit 34. The signal current is applied through a second servo filter 36 to a second input terminal of mode control and DC amplifier unit 34. In response to the two just described input signals, unit 34 controls the output voltage level therefrom. The output of mode control and DC amplifier unit 34, designated variable target voltage (VTV), is coupled through a load resistor 38 to vidicon 10 so as to control the target voltage thereof.

Figure 2:
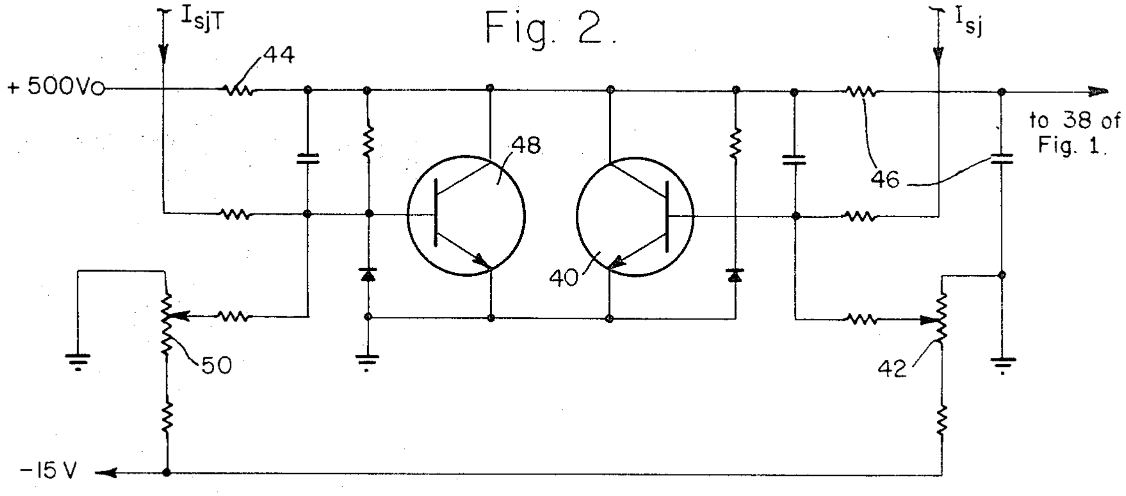
FIG. 2 is a schematic diagram of the servo filters, and the mode control — DC amplifier unit of FIG. 1.

Reference is now primarily directed to FIG. 2 which shows the servo filters, and the mode control and DC amplifier unit of FIG. 1 in greater detail. As shown in FIG. 2, the signal current ($I_{sj}$) is applied through filter 36 to the base of a transistor 40, and a bias potential is applied from the wiper of a potentiometer 42 to the base of transistor 40. During a first operational mode, the bias level applied to potentiometer 42 determines the value of the constant average signal current ($I_{sj}$). If during this first operational mode, the signal current deviates from the preselected value, as determined by the setting of potentiometer 42, the current through transistor 40 is regulated to produce the required voltage drop across a resistor 44 so as to provide the correct value of variable target voltage (VTV) from output filter 46. The VTV signal from filter 46 is coupled through load resistor 38 (FIG. 1) to vidicon 10.

Similarly, the total current ($I_{sjT}$) is applied through servo filter 32 to the base of a transistor 48; and a bias potential is applied to the base of transistor 48 from the wiper of a potentiometer 50. The bias potential applied from potentiometer 50 determines the $I_{sjT}$ current level at which transistor 48 assumes primary control of the VTV signal. Transistor 48, in response to the total current signal ($I_{sjT}$), regulates the current through resistor 44 in a manner similar to that explained above relative to transistor 40, so that the necessary output voltage from filter 46 (VTV) is provided to cause the total vidicon output current not to exceed the preselected value. It is the time period when transistor 48 is primarily controlling the output voltage (VTV) which is referred to herein as the second operational mode.

Figure 3:
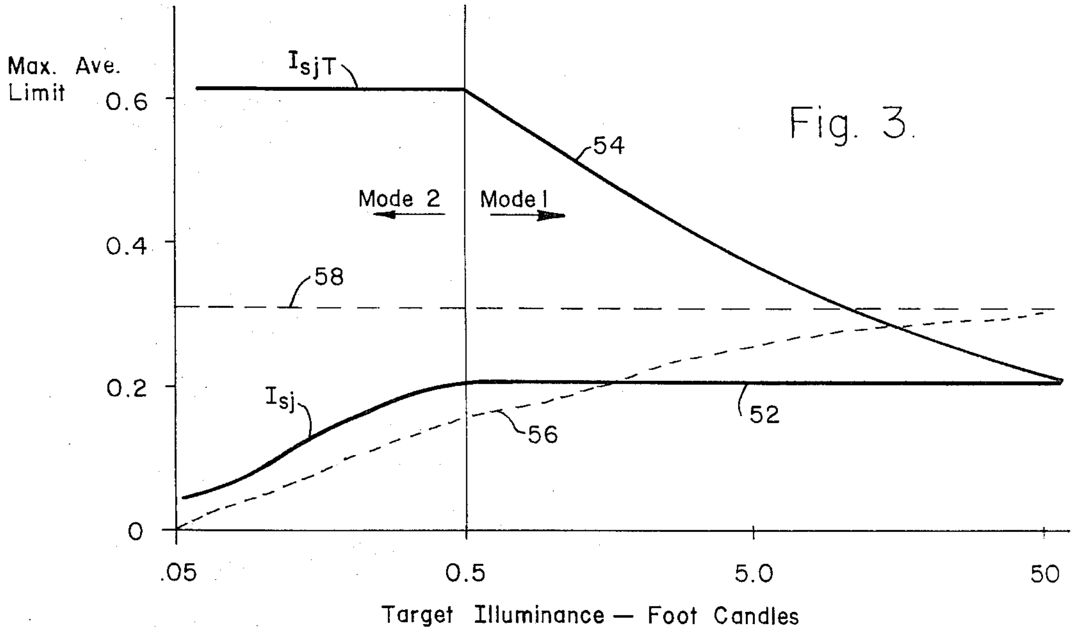
FIG. 3 is a diagram of target current versus target luminance, useful for explaining the advantages of the invention.

The operation of the subject invention will now be further described with reference primarily to FIG. 3. As indicated above, the system of FIG. 1 has two modes of target voltage control, to wit: mode one during which the control is provided as a function of the signal current ($I_{sj}$); and mode two during which the control is provided as a function of the total current ($I_{sjT}$). Typical closed loop operation of the system of FIG. 1 is illustrated by the curves 52 and 54, the signal current ($I_{sj}$) and the total current ($I_{sjT}$), respectively, of FIG. 3. The dark current ($I_{sjd}$) may be considered equal to the difference in the total current and signal current values. The curves 56 and 58 illustrate the signal and total currents, respectively, for a conventional television camera system; and are shown for the purpose of better explaining the advantages of the invention.

In the operation of the system of FIG. 1, during mode one, the vidicon target voltage is controlled as a function of the average signal current ($I_{sj}$). As shown in FIG. 3 for some given moderate target temperature, at high target luminance levels (e.g., 50 foot candles), the average signal current (wave 52 of FIG. 3) is 0.2 microamperes ($\mu a$), the total current ($I_{sjT}$) is nearly equal to the signal current ($I_{sj}$) and hence the dark current is low. As the target luminance decreases towards 0.5 foot candles, the signal current ($I_{sj}$) remains essentially constant at 0.2 $\mu a$, but due to the target voltage increases, the dark current increases and the total current approaches a preselected maximum value. This maximum level which is shown in FIG. 3 as 0.6 $\mu a$ is determined by the setting of potentiometer 50 (FIG. 2). Limiting the maximum value of the total current prevents undesirable defocusing of the beam at excessively high current levels; and it prevents damage to the photoconductor (target), which might result if the total current were allowed to increase without limit.

Still referring primarily to FIG. 3, as the target luminance decreases below 0.5 foot candles, the electronic voltage control servo system (see FIG. 2) switches to mode two. This change in modes is caused by the total current ($I_{sjT}$) reaching the preselected maximum current limit as determined by the setting of potentiometer 50 (FIG. 2). During mode two transistor 48, in response to the total current signal applied to the base thereof, regulates the VTV voltage so as to prevent the total current from exceeding the maximum value.

It is noted that the output amplifier 29 of FIG. 1 may include an automatic gain control device (AGC loop) which operates to hold the signal current at the output thereof constant during mode two.

The advantages of the subject invention may be better understood by considering the signal current and total current which would be produced by a conventional system which controls the target voltage exclusively as a function of the total output current from the vidicon. As shown by curve 56, of FIG. 3, the signal current for such a conventional system continually decreases as the target luminance decreases. It should also be understood that the decrease in signal current is much more pronounced in conventional systems at higher temperatures where the dark current is substantially greater, than for the case depicted in FIG. 3. Also, it may be seen that by maintaining the total current constant, as is shown by curve 58 of FIG. 3 for the conventional system, that the dynamic range at higher target luminance is reduced.

Although the advantages of the subject invention have been explained hereinabove primarily with respect to variations in target luminance levels, and with the target at a given moderate temperature; it is understood that the invention provides similar advantages in compensating for temperature variations. A plot similar to that of FIG. 3 may be used to illustrate the invention's operation with variations in temperature, by merely substituting increasing temperature for decreasing target luminance in the plot of FIG. 3.

Figure 4:
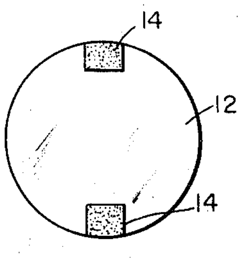
FIG. 4 is a plan view of the faceplate of a television sensor showing a second configuration of the masked area used for monitoring the sensor dark current.

Although a selected preferred embodiment of the invention has been described herein with particularity, it is understood that many changes and/or modifications thereto may be made without departing from the scope of the subject invention. For example, although image sensor 10 is described as a vidicon type television camera in the illustrated embodiment, any suitable image sensor having a target sensitive to incident energy, and means for controlling the target's sensitivity scale factor in response to a control voltage, may be used. Also, it is noted that numerous configurations for mask 14 (FIG. 1) are applicable, and any suitable means (mechanical or optical) which shields a selected portion of the target from received energy may be employed. For instance, in applications where a less representative means dark current value for the entire target area is acceptable, the mask arrangement illustrated in FIG. 4, which allows a larger scene area, may be preferred. It is further noted that although in the illustrated embodiment the signal current is held at a preselected constant value during mode one; it will be readily apparent that for other applications unit 34 may be modified to provide any desired response characteristic for the signal current; such as a linearly increasing or decreasing response, for example.

Thus there has been described a new and useful system for controlling the target voltage of an image sensor to provide a constant signal current for most target luminance conditions; higher signal to noise ratios at the lower target luminance levels; and greater dynamic range at the medium to high target luminance levels.

I claim:

1. In combination with a television camera which includes a photoconductor target having a section thereof masked against received illumination and means for scanning said target with an electron beam to produce an output current, a system for controlling the target voltage of said television camera comprising:

means for providing a dark current signal as a function of the output current produced during periods said electron beam scans the masked section of said target;

means for modifying said output current as a function of said dark current signal to provide a signal current; and control means responsive to said signal current and to said output current, for controlling said target voltage to cause said signal current to be maintained at a first preselected value during operational periods said output current is less than a second preselected value; and for controlling said target voltage to cause said output current to be maintained at said second preselected value during other operational periods.

2. The system of claim 1 wherein said means for modifying includes means for subtracting said dark current signal from said output current to form said signal current.

3. The system of claim 2 wherein said control means includes a variable output voltage supply device which is controlled in response to said signal current during operational modes in which said output current is less than said second preselected value, and is controlled primarily by said output current during other operational modes in which said output current is approximately equal to said second preselected value.

4. In combination with a television camera having a photon sensitive target and means for scanning said target with an electron beam to produce an output current; a system for controlling the target voltage of said television camera, comprising:

means for masking a section of said target from received photons;

level sensing means, synchronized with said means for scanning, for providing a dark current signal as a function of the output current produced during the periods said electron beam scans the masked section of said target;

means for modifying said output current as a function of said dark current signal to provide a signal current; and control means, responsive to said signal current and to said output current, for controlling said target voltage to cause the average value of said signal current to be maintained at a substantially constant first preselected value during operational periods the average value of said output current is less than a second preselected value; and for controlling said target voltage to cause the average value of said output current to be maintained at said second preselected value during other operational periods.

5. The system of claim 4 wherein said level sensing means includes means for forming said dark current signal as a function of the time weighted average of the output current produced during the scanning periods of the masked section of said target; and said means for modifying includes means for subtracting said dark current signal from said output current to form said signal current.

6. The system of claim 4 wherein said control means includes a controllable voltage supply device which is controlled in response to said signal current, during operational modes in which the average value of said output current is less than said second preselected value; and is controlled primarily by said output current, during other operational modes in which the average value of said output current is approximately equal to said second preselected value.

7. An imaging system comprising:

an image sensor having a target sensitive to received energy, and means for scanning said target to produce an output current at a scale factor which is a function of an applied control signal;

means for masking a preselected portion of said target from received energy;

level sensing means, synchronized with said means for scanning, for providing a dark current signal as a function of the output current produced during scanning periods of the masked portion of said target;

means for providing a signal current as a function of said dark current signal and said output current; and control means, responsive to said signal current and to said output current, for regulating said control signal to provide said signal current, in accordance with a preselected function of said received energy, during operational modes in which the average value of said output current is less than a first preselected value; and for regulating said control signal to cause the average value of said output current to be maintained at said first preselected value during other operational modes.

8. The system of claim 7 wherein said level sensing means includes means for providing said dark current signal as a function of the time weighted average of the output current produced during scanning periods of the masked portion of said target; and said control means includes means for regulating said control signal to cause the average value of said signal current to be substantially maintained at a second preselected value during said operational modes in which the average value of said output current is less than said first preselected value.

9. The system of claim 7 wherein said level sensing means includes means for providing said dark current signal as a function of the time weighted average of the output current produced during scanning periods of the masked portion of said target; and said means for providing said signal current includes means for subtracting said dark current signal from said output current to form said signal current.

* * * * *